Figure 1:
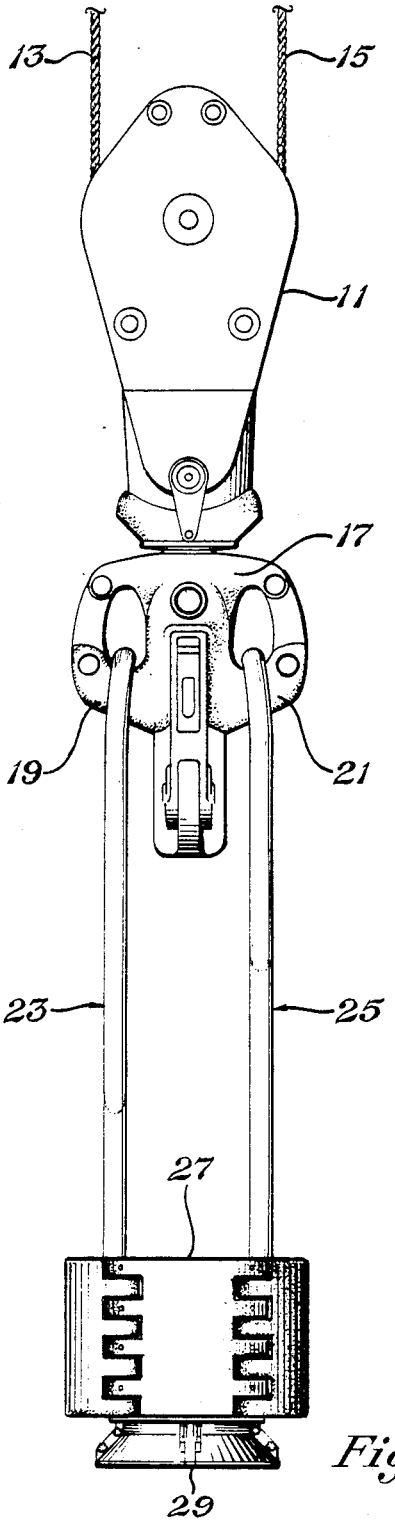
Figure 2:
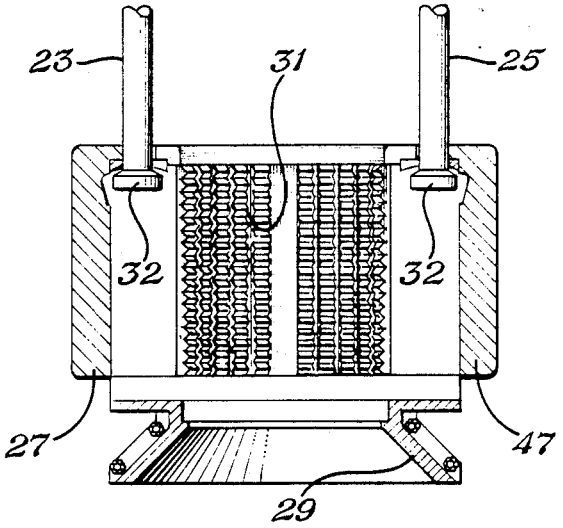
Figure 3:
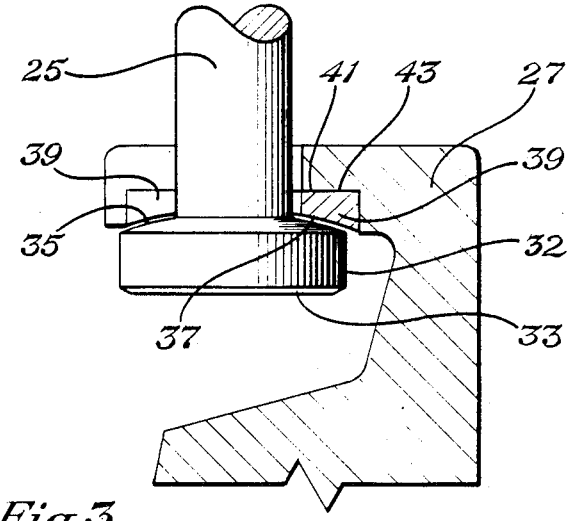
Figure 4:
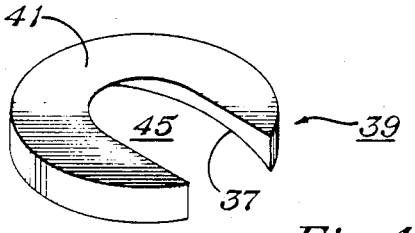

United States Defensive Publication [19] (H) [11] T105,101

Hamilton [43] Feb. 5, 1985

[54] CASING HANDLING EQUIPMENT

[76] Inventor: William R. Hamilton, 5914 W. Airport Blvd., Houston, Tex. 77035

[21] Appl. No.: 502,849

[22] Filed: Jun. 9, 1983

[51] Int. Cl.[3] ..... E21B 19/02; B66C 1/42

[52] U.S. Cl. ..... 294/90

[57] ABSTRACT

An apparatus, for use with a traveling block and a drilling hook, for handling large diameter casing. A pair of links (23) (25) are suspended from link ears on the drilling hook. At the lower end of each link is a link connector (32), which preferably has a flat bottom surface and a spherical upper surface. The spherical upper surface mates with a similarly shaped surface on a removeable plate, forming a ball-and-socket type connection. Each plate has a flat upper surface which fits into a slot in an elevator (27). The slots for the connectors and plates are located within the circumference of the cylindrical body of the elevator, thus keeping the links oriented vertically even with large diameter elevator.

1 Claim, 1 Sheet Drawing,

9 Pages Specification

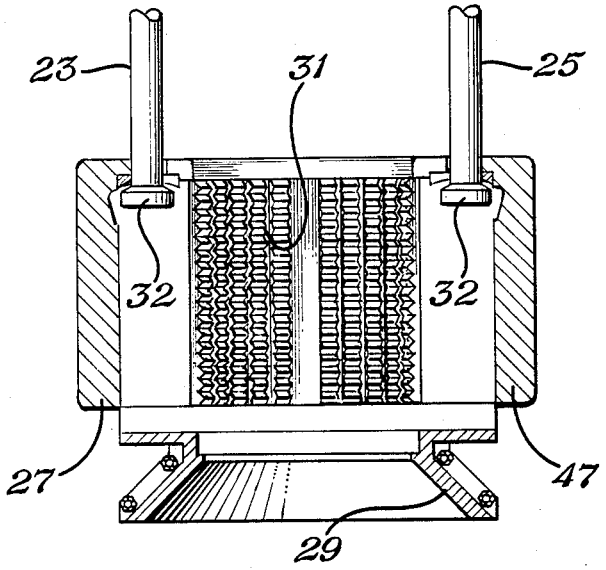

The file of this unexamined application may be inspected and copies thereof may be purchased (849 O.G. 1221, Apr. 9, 1968).